United States Patent [19]

Fraenkel et al.

[11] Patent Number: 5,565,399
[45] Date of Patent: Oct. 15, 1996

[54] CO OXIDATION PROMOTER AND USE THEREOF FOR CATALYTIC CRACKING

[76] Inventors: Dan Fraenkel, 71 Independence Dr., East Brunswick, N.J. 08816; Inez L. Moselle, 245 Cristol St., Metuchen, N.J. 08840

[21] Appl. No.: 268,385

[22] Filed: Jun. 29, 1994

[51] Int. Cl.⁶ .............................. B01J 23/40; B01J 21/04
[52] U.S. Cl. .......................... 502/304; 502/303; 502/334
[58] Field of Search .................... 502/304, 303, 502/334

[56] References Cited

U.S. PATENT DOCUMENTS

| | | | |
|---|---|---|---|
| 3,944,482 | 3/1976 | Mitchell et al. | 208/120 |
| 4,072,600 | 2/1978 | Schwartz | 208/120 |
| 4,088,568 | 5/1978 | Schwartz | 208/121 |
| 4,107,032 | 8/1978 | Chester | 208/120 |
| 4,137,151 | 1/1979 | Csicery | 208/120 |
| 4,170,573 | 10/1979 | Ernest et al. | 502/304 |
| 4,171,286 | 10/1979 | Dight et al. | 252/455 Z |
| 4,222,856 | 9/1980 | Hansel et al. | 208/120 |
| 4,252,636 | 2/1981 | Mooi | 502/42 |
| 4,350,614 | 9/1982 | Schwartz | 252/455 Z |
| 4,350,615 | 9/1982 | Meguerian et al. | 252/455 Z |
| 4,380,510 | 4/1983 | D'Aniello, Jr. | 502/332 |
| 4,585,752 | 4/1986 | Ernest | 502/314 |
| 4,608,357 | 8/1986 | Silverman et al. | 502/84 |
| 4,714,694 | 12/1987 | Wan et al. | 502/333 |
| 4,839,026 | 6/1989 | Brown et al. | 208/120 |
| 5,110,780 | 5/1992 | Peters | 502/303 |
| 5,164,072 | 11/1992 | Peters | 208/122 |

*Primary Examiner*—Pal Asok
*Assistant Examiner*—Bekir L. Yildirim

[57] ABSTRACT

CO promoter particles for an FCC unit comprising transition alumina and containing at least 3% cerium oxide and from 2 to 8% lanthanum oxide.

4 Claims, 4 Drawing Sheets

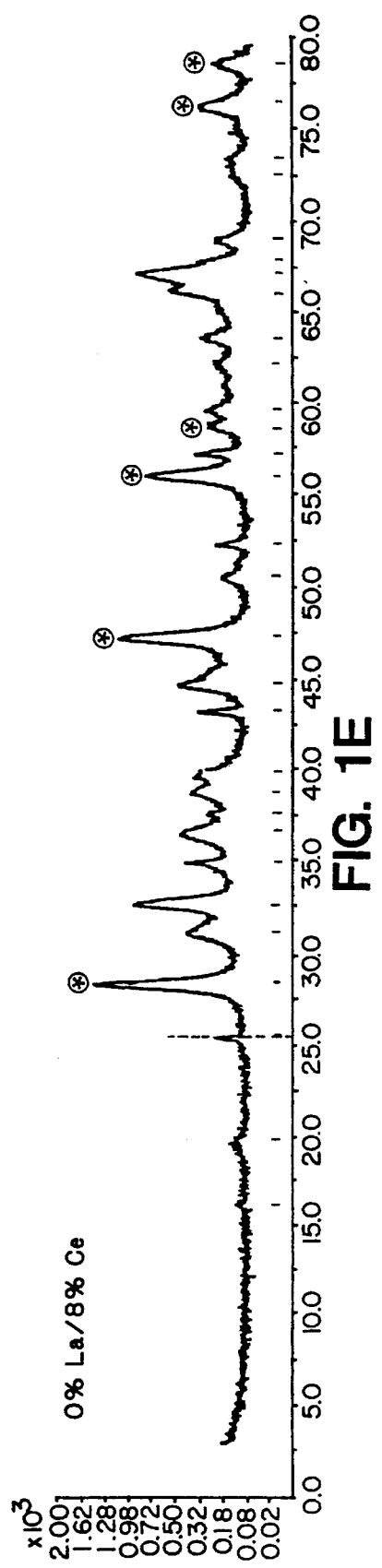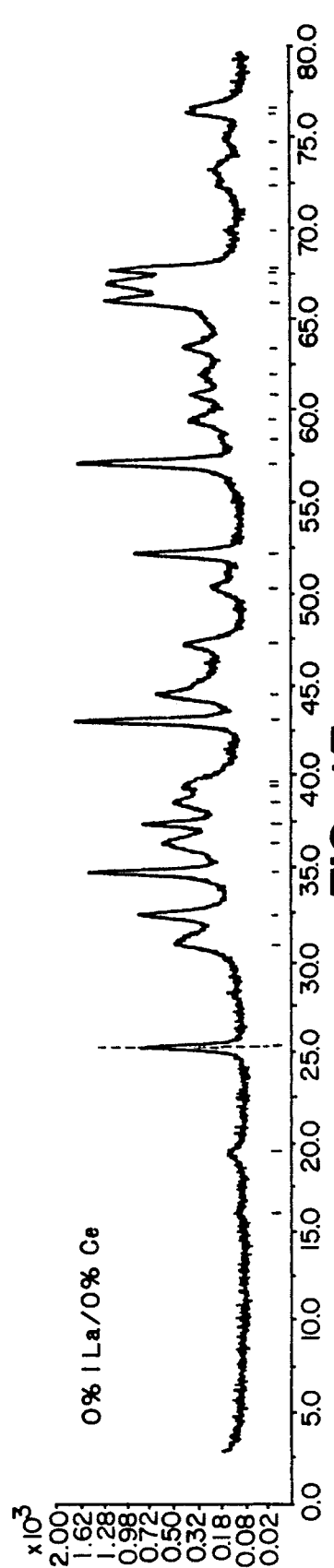

CO OXIDATION PROMOTER AND USE THEREOF FOR CATALYTIC CRACKING

The invention relates to a novel CO promoter for use in a fluid catalytic cracking (FCC) unit. The promoter is composed of catalytic platinum particles dispersed over alumina support particles and stabilized physically and chemically with a mixture of rare earth for higher catalytic activity, longer catalyst durability and better unit retention of the catalyst in a cracking unit.

BACKGROUND OF THE INVENTION

Present-day continuous cyclic FCC processes utilize fluidizable catalyst particles containing a crystalline zeolitic aluminosilicate component (usually an ion-exchanged form of a synthetic crystalline faujasite) and a porous inorganic oxide matrix. This type of catalyst must be regenerated to low carbon levels, typically 0.5% or less, to assure that the catalyst particles possess desired activity and selectivity before the particles are recycled to a conversion zone for catalytic upgrading of hydrocarbon feedstock. In most regenerators the combustible solids deposited on the spent solid catalyst particles from the cracking zone are burned in a confined regeneration zone in the form of a fluidized bed which has a relatively high concentration of catalyst particles (dense phase). A region of lower solids concentration (dilute phase) is maintained above the dense phase. A typical regeneration cycle is described in U.S. Pat. No. 3,944,482 to Mitchell.

High residual concentration of carbon monoxide in flue gases from regenerators have been a problem since the inception of catalytic cracking processes. The evolution of FCC has resulted in the use of increasingly high temperatures in FCC regenerators in order to achieve the required low carbon levels in the regenerated crystalline aluminosilicate catalysts. Typically, present day regenerators now operate at temperatures in the range of about 1100° F. to 1350° F. when no promoter is used and result in flue gases having a $CO_2/CO$ ratio in the range of 1.5 to 0.8. The oxidation of carbon monoxide is highly exothermic and can result in so-called "carbon monoxide afterburning" which can take place in the dilute catalyst phase, in the cyclones or in the flue gas lines. Afterburning has caused significant damage to plant equipment. On the other hand, unburned carbon monoxide in atmosphere-vented flue gases represents a loss of flue value and is ecologically undesirable.

Restrictions on the amount of carbon monoxide which can be exhausted into the atmosphere and the process advantages resulting from more complete oxidation of carbon monoxide have stimulated several approaches to the provision of means for achieving complete combustion of carbon monoxide in the regenerator.

The use of precious metals to catalyze oxidation of carbon monoxide in the regenerators of FCC units has gained broad commercial acceptance. Some of the history of this development is set forth in U.S. Pat. No. 4,171,286 and U.S. Pat. No. 4,222,856. In the earlier stages of the development, the precious metal was deposited on the particles of cracking catalyst. Present practice is generally to supply a promoter in the form of solid fluidizable particles containing a precious metal, such particles being physically separate from the particles of cracking catalyst. The precious metal, or compound thereof, is supported on particles of suitable carrier material and the promoter particles are usually introduced into the regenerator separately from the particles of cracking catalyst. The particles of promoter are not removed from the system as fines and are cocirculated with cracking catalyst particles during the cracking/stripping/regeneration cycles. Judgement of the CO combustion efficiency of a promoter is done by measuring the difference in temperature, delta T, between the (hotter) dilute phase and the dense phase.

There is a constant search for FCC CO promoters of higher activity and longer durability of unit retention. To be effective, a CO promoter must have physical properties that allow it to be retained within the FCC unit. High density CO promoter particles are desirable since they are less likely to be entrained in the flue gas and carried out through the cyclones. They are also more likely to promote CO combustion within the regenerator dense phase, where it is desired, than in the dilute phase, where it contributes to afterburning. The particle size distribution of the CO promoter microspheres is another important physical property since larger particles are more likely to be retained by cyclones than smaller ones. Similarly, very attrition resistant particles are desirable since they are less likely to generate fines which can be lost through the cyclones, carrying a portion of the CO promoter's activity with them.

CO promoters should, therefore, be as dense, coarse, and attrition resistant as the manufacturer can make them. These characteristics do not adversely affect catalyst fluidization or circulation, however, since the promoter concentration is so low (generally less than 1% of the catalyst inventory).

Promoter products formerly used on a commercial basis in FCC units include calcined spray dried porous microspheres of kaolin clay impregnated with a small amount (e.g., 100 or 500 ppm) of platinum. Reference is made to U.S. Pat. No. 4,171,286 (supra). Most commercially used promoters are obtained by impregnating a source of platinum on microspheres of high purity porous alumina, typically gamma alumina. The selection of platinum as the precious metal in various commercial products appears to reflect a preference for this metal that is consistent with prior art disclosures that platinum is the most effective group VIII metal for carbon monoxide oxidation promotion in FCC regenerators. See, for example, FIG. 3 in U.S. Pat. No. 4,107,032 and the same figure in U.S. Pat. No. 4,350,614. The figure illustrates the effect of increasing the concentration of various species of precious metal promoters from 0.5 to 10 ppm on $CO_2/CO$ ratio.

Commonly assigned U.S. Pat. No. 4,608,357 (Silverman et al.) teaches that palladium is unusually effective in promoting the oxidation of carbon monoxide to carbon dioxide under conditions such as those that prevail in the regenerators of FCC units when the palladium is supported on particles of a specific form of silica-alumina, namely leached mullite. The palladium may be the sole catalytically active metal component of the promoter or it may be mixed with other metals such as platinum.

U.S. Pat. Nos. of Schwartz (4,350,614, 4,072,600 and 4,088,568) mention rare earth addition to Pt based CO promoters. An example is 4% REO that shows some advantage. There is no teaching of any particular effect of a particular RE metal or any difference(s) between different RE metals and how they influence promoter stability and performance.

Csicsery, in U.S. Pat. No. 4,137,151 discloses that lanthanum at concentrations of 0.05–10% is effective in FCC CO combustion when dispersed on the catalyst or associated with a refractory matrix material such as alumina. However, Csicsery does not teach CO promoters based on a precious metal such as platinum.

Brown et al., U.S. Pat. No. 4,839,026, discloses FCC catalysts active in CO combustion, which are based on precious metal supported on oxides, including alumina and cocirculated with separate particles of alumina treated with rare earths, including 48% mixtures of La and Ce. The rare earth, preferably cerium, is used for SOx pickup.

Ernest in U.S. Pat. No. 4,585,752 discloses a high temperature stable catalyst made of a base metal such as Cr, Hf and Nb or their oxides in a matrix of composite particles having a platinum group metal on a ceria promoted refractory oxide powder, such as alumina. The catalyst was found to catalyze combustion of hydrocarbon fuel. It is disclosed that the ceria enhances the dispersion and stability of the platinum group metal in the catalyst composition. There is no mention in U.S. Pat. No. 4,585,752 of a Ce-Pt catalyst without the base metal and there is no disclosure suggesting that the catalyst is effective in FCC CO promotion.

U.S. Pat. Nos. 4,350,614, 4,072,600 and 4,088,568, Schwartz, disclose the possibility of adding $RECl_3 6H_2O$ with a platinum promoter for FCC. Example 10 discloses a catalyst containing 4.2% REO. Example 14 (without RE) and 15 (with RE) show the advantage of using RE on CO combustion.

U.S. Pat. No. 4,350,615 (Meguerian et al.) teaches a CO combustion promoter composed of Pd-Ru which also enhances SOx removal.

Peters U.S. Pat. Nos. 5,164,072 and 5,110,780, relate to an FCC CO promoter having Pt on La-stabilized alumina, preferably about 4–8 weight percent $La_2O_3$. It is disclosed that ceria "must be excluded". At col. 3, it is disclosed that "In the presence of an adequate amount of $La_2O_3$, say about 6–8 percent, 2 percent Ce is useless. It is actually harmful if the $La_2O_3$ is less." In an illustrative example Peters demonstrated an adverse effect of 8% Ce on CO promotion of platinum supported on a gamma alumina and a positive effect of La. It is noted that the calcination temperature used in illustrative examples in these patents was 1350° F. Peters also cites previous work such as RE stabilized alumina and the use thereof in washcoat for auto exhaust catalyst application.

One of the best promoters commercially available prior to this invention is understood to be based on platinum dispersed over lanthanum (about 8% lanthana) supported on transition alumina.

By way of summary, the prior art does not teach that ceria would be useful in FCC CO promotion of $Pt/Al_2O_3$ catalysts. The teachings of Peters are to the contrary.

SUMMARY OF THE INVENTION

This invention results from the unexpected discovery that it is highly desirable to impregnate alumina support particles for a platinum promoter with both cerium and lanthanum provided the cerium is used in sufficient amount and the impregnated alumina particles are calcined at a temperature in excess of 1000° C. According to the present invention, relatively large (e.g., 7.2%) Ce levels in a Pt/alumina CO promoter are not affecting adversely the Catalytic performance of Pt, and in fact have beneficial effect(s). Surprisingly, Ce increases the promoter activity and also contributes to the required hardness of the alumina substrate. The preferred alumina support is a mixture of theta and delta alumina, free from the alpha phase.

The modified CO combustion promoter of this invention can be used successfully in FCCU's for partial or complete combustion of CO in the regenerator to decrease delta T by eliminating afterburn and to reduce CO emissions in the flue gas. Use of effective CO promoters in FCC also allows to operate the unit without the steam-generating CO boilers. A further advantage of a CO promoter is a higher regenerator temperature which results in higher delta coke and therefore lower catalyst addition rate and/or catalyst circulation rate, and higher saleable liquid product recovery.

It is believed that the catalyst according to this invention is more active and stable because of the higher intrinsic stability of the highly dispersed platinum over the stabilized alumina and its protection from poisoning, and because of the increased local concentration of oxygen in the vicinity of the CO activating Pt catalytic center.

DESCRIPTION OF PREFERRED EMBODIMENTS

The Alumina Support

Figure 1A:
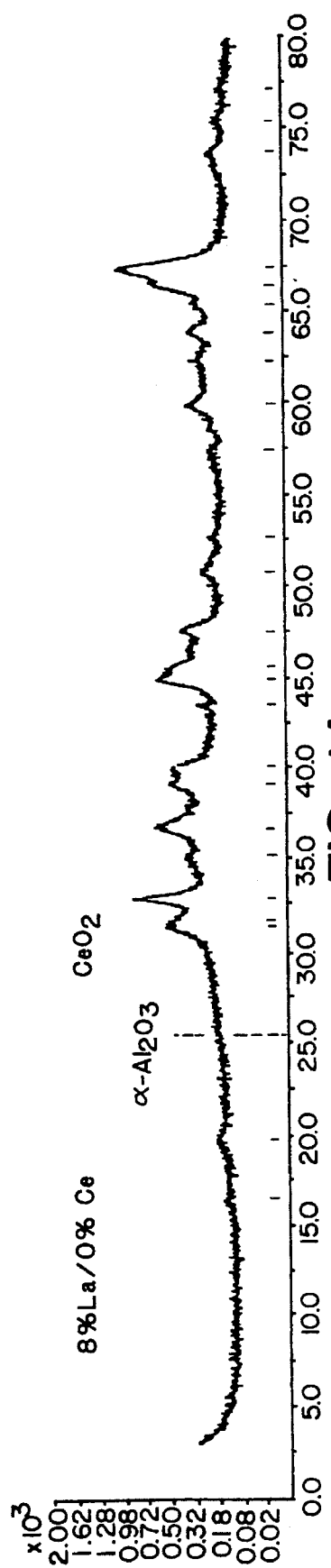
FIG. 1 are x-ray diffraction patterns showing the effect of Ce, La and Ce-La combination, all at 8% total loading of the oxide on phase composition of a transition alumina support after calcination at 1100° C.
Figure 1B:
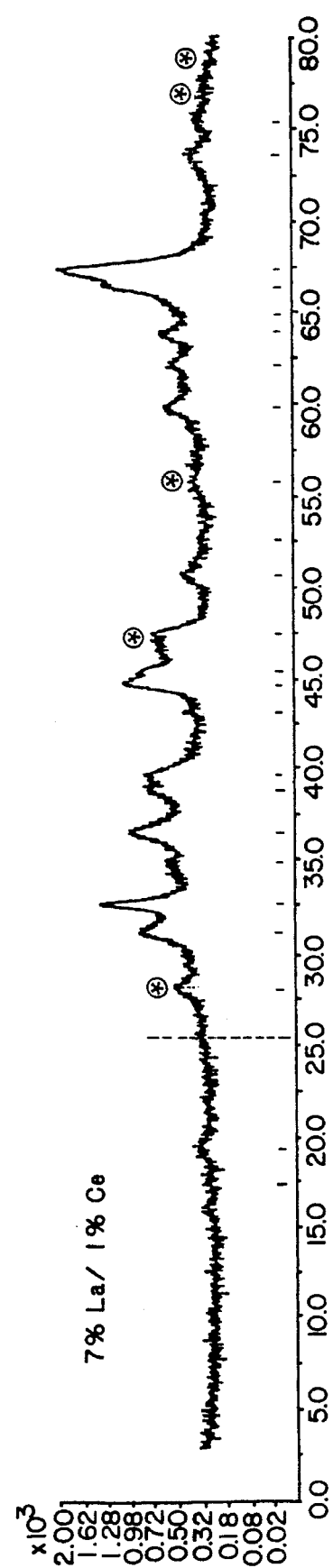
Figure 1C:
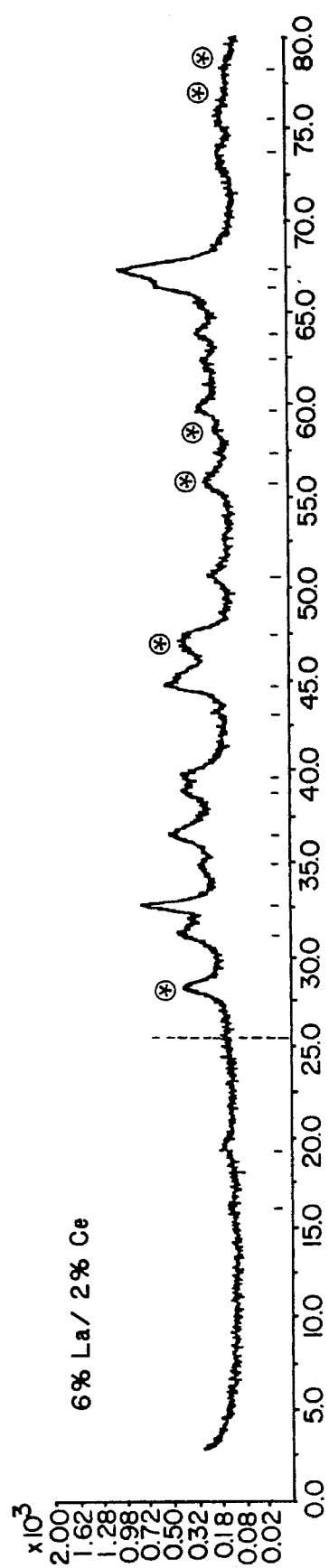
Figure 1D:
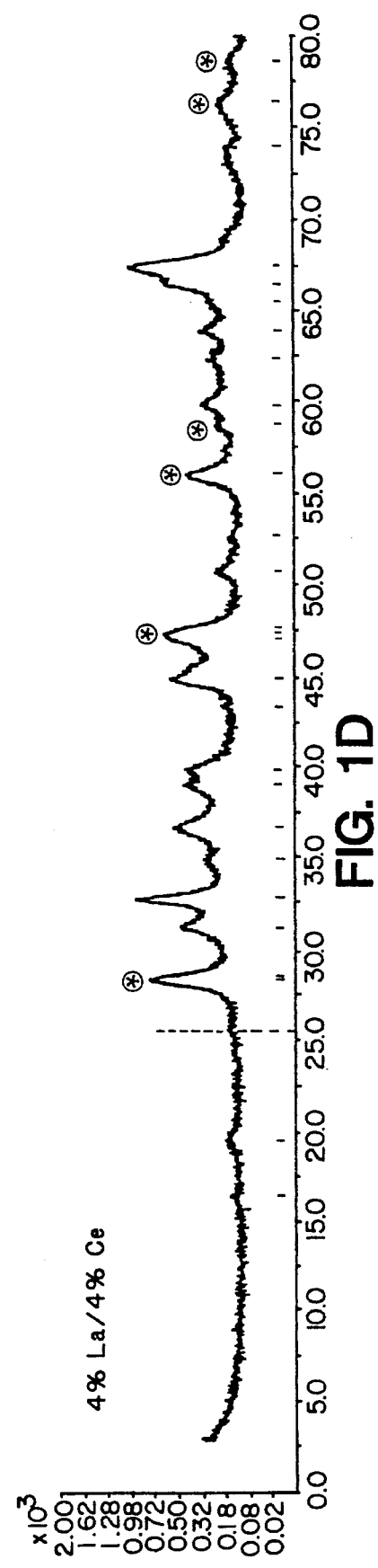

For a successful $Pt/Al_2O_3$ CO promoter FCC catalyst to be realized, it is essential to use a refractory alumina material such as hardened transition (delta, theta, mixture thereof and mixtures thereof with gamma) alumina in the form of microspheres or other particles of suitable size and impregnate the platinum over it using a solution of Pt salt such as an ethanolamine complex of platinum. The starting alumina should have a surface area (BET) preferably between about 70 and 130 $m^2/g$, between 85 and 95 $m^2/g$; pore volume of 0.30–0.38 cc/g, preferably 0.33–0.36 cc/g; and average particle size of 65–85 micrometers, preferably about 75 micrometers.

An especially preferred alumina is a high purity transition alumina (delta, theta, mixture) having the following approximate elemental analysis: Al as >98% $Al_2O_3$, <1.0% LOI (water) and <1.0 impurities. A good alumina material as described herein should have high attrition resistance such as a Roller of ~4 (4% weight loss per hour; between 20 and 80 minutes of the attrition experiment). The Roller attrition value should not exceed about 5. An example of commercial alumina material having the above properties is Puralox® SCCa-5/90 alumina supplied by Condea Chemie GmbH, a German company.

In the case of a starting alumina with BET surface area of 90–100 $m^2/g$, the Ce-La stabilization would typically cause a reduction of 25–35 $m^2 g^{-1}$ after calcination at 1100° C. If substantial amount of alpha alumina is formed, by calcining an unstabilized alumina, or calcining the stabilized alumina at higher temperature or prolonged times, the decrease in surface area would typically be 60–80 $m^2 g^{-1}$.

Impregnation With Rare Earths

In practice of this invention, a Pt CO combustion catalyst is supported over a Ce-La modified transition alumina which, as mentioned, is preferably a mixture of the aforementioned theta-delta alumina free of the alpha phase. $La_2O_3$ coats the alumina thereby providing higher stability and hardness after calcination at about 1100° C., and $CeO_2$, while not harming this stabilization, provides promotion of the Pt CO combustion catalytic activity. The alumina is typically hardened to Roller <2 as a result of addition of rare earth and calcining, and activity is typically enhanced by 10–20%. It is believed that cerium, by virtue of its redox properties, may act as an effective oxygen sink providing higher surface concentration of the oxygen over the catalyst and therefore higher CO combustion rate. Both La and Ce are also effective in trapping/removing poisoning contaminants of the FCC regenerator atmosphere, such as SOX/NOX, thus protecting the Pt catalytic centers from fouling and ensuring their longer durability.

The alumina is impregnated (prior to treatment with platinum) by separate addition of sources of Ce and La (added in any sequence) or with a suitable rare earth mixture, especially a mixture containing substantial amounts of Ce (e.g., about 40–50%) and additional amounts of and other metal such as lanthanum, neodymium, yttrium or mixtures thereof. Commercial rare earth mixtures sufficiently rich in Ce are also suitable. An example for an especially effective mixture is 8% wt. total REO (rare earth oxide) made of 50% wt. ceria (calculated as $CeO_2$) and 50% wt. lanthana (calculated as $La_2O_3$).

It has been found that about 4% lanthana in the alumina acts as a stabilizer for platinum by coating which prevents formation of the alpha phase of alumina otherwise formed above 1000° C. For effective stabilization, the lanthanum-treated alumina must be calcined (prior to platinum treatment) at about 1100° C., more broadly between 1000° and 1200° C. but not at 1000° C., or below. This temperature exceeds the calcination temperatures used by Peters.

Impregnation is performed by using a salt solution, preferably nitrate solution of the lanthanum, cerium, or mixed rare earth solution employing the incipient wetness method, or by spraying the solution over the alumina. The solution constitutes about 90% of the free pore volume of the starting alumina. After equilibration to ensure uniform impregnation (pore filling), the obtained homogeneous and lump-free powdery material is dried at 100°–150° C., preferably 130° C. in vacuum oven, for at least 1 hour and until the solid is essentially water-free. It is then calcined for 0.5–10 hours, usually 2–3 hours.

Ce can be added with the source of La (for example, as nitrate), before La addition, or after it. The impregnation method is as above.

FIG. 1 shows the effect of Ce, La and Ce-La combinations, all at 8% total REO on phase composition of the alumina obtained after calcination at 1100° C., as measured by x-ray diffraction on a Philips PW1820 instrument, using CUK1 radiation. The unstabilized alumina (0% Ce-0% La) contains substantial amounts of alpha alumina considered in this invention to be a negative factor in the design of the improved Pt CO promoter substrate. With 8% Ce, alpha alumina is also formed but to a much lesser extent; hence Ce has an effect of suppressing the formation of alpha alumina. The x-ray pattern shows that $CeO_2$ is formed as a separate phase. Lanthana does not exhibit a separate crystallagraphic entity, and is therefore, coating the alumina entirely. Thus, cerium is not so effective for coating the alumina as other RE metal oxides such as lanthana, neodymia and yttria. Except for the $CeO_2$ and alpha alumina, transition alumina is the only detectable phase in the 8% Ce case.

Impregnation of Precious Metal Compound on Support Particles

Simple impregnation of the alumina with a solution of soluble precious metal compound (after impregnation with sources of cerium and lanthanum) followed by drying will suffice to achieve effective deposition of the precious metal compound since the alumina has adequate porosity for uniform dispersion of trace amounts of an impregnant. Organic or aqueous solutions of precious metal compounds can be used, such as salts and complexes.

The precious metal compound may be one in which the precious metal is in the anion, for example chloroplatinic acid, or the precious metal may be in the cation, for example Tris(ethylenediamine)platinum(IV) tetrachloride. Typical inorganic compounds that are suitable sources of platinum, ammonium platinum hexachloride, chloroplatinic acid, diaminodichloroplatinum, diaminedinitroplatinum and tetraamineplatinous hydroxide. Typical organic compounds include platinum acetylacetonate, dichlorodicarbonylplatinum(II) and trimethylplatinum chloride. Excellent results have been achieved with "A-salt", which is diethanolamine hexahydroxyplatinum (IV).

Combinations of platinum and one or more other precious metals, such as palladium may also be used.

The microspheres should be agitated during impregnation with the solution of precious metal compound to ensure uniform distribution of the Pt solution in the pores. After the precious metal compound is applied as a solution, a drying step could be used to fix the metal on the support. Especially in the case of promoter that is not used for a prolonged period of time after it has been produced (e.g., a half year), the precious metal(s) may be reduced to elemental metal(s) by treatment with a suitable reducing agent prior to introduction into the regenerator of the FCC unit.

Generally, the promoter particles contain from 100 to 1000 ppm, preferably from 200 to 800 ppm platinum metal, and most preferably from 300 to 600 ppm platinum.

The level of precious metal in a blend of promoter particles and separate catalyst particles is usually in the range of 0.5 to 10 ppm (based on the total mixture) when full combustion is desired. From 0.5 to 3 ppm are recommended for use in units operating with partial combustion. The suitable level of precious metal will vary with the design of a particular regeneration system.

Definition and Details of Test Procedures Used Herein Precious Metal Content Platinum content was determined by colorimetric analysis. Unless otherwise mentioned the concentration of platinum is reported as parts per million (ppm) based on the weight of solid promoter (metal plus support), the weight of the solid promoter being on a volatile free (VF) weight basis.

LOI=Loss on Ignition-Loss of weight of a material upon heating to 1000° C. for 1 hour.

Volatile free (VF) weight-The weight of a material not including any vaporizing components, calculated from LOI.

Roller Attrition Test - This test, described in U.S. Pat. No. 5,082,814, is incorporated herein by cross-reference.

The following sample preparation and test conditions were used in carrying out CO combustion test reported herein.

Sample Preparation:

An Engelhard FCC standard catalyst, 0S+580™ is steam-deactivated at 1450° F. for 4 hours with 100% steam, then screened between 100 and 270 mesh. This is used as promoter blend to simulate a realistic FCC unit situation. The fresh promoter is dried at 150° F. for 2 hours and cooled in a desiccator, then screened between 100 and 270 mesh. 20 grams of the promoter are blended with 180 grams of the steamed 0S+580. The blend is mixed in a less-than-half-full jar for 15 minutes in a Norton Universal Lab Mixer equipped with arms to hold the jar. The promoter blend, having approximately 50 ppm Pt if the promoter target Pt level is 500 ppm, is steamed at 1450° F. for 4 hours with 90% steam and 10% air. A selected amount of the steamed promoter blend is placed in the CO combustion tube reactor, between two layers, 3.0 grams each, of an inert diluent—Engelhard's MS-lOX™ kaolin clay microsphere, to make a total catalyst bed with a Pt level within the range 0.2–1.1 ppm. (The CO combustion test provides the result as CO conversion and thus plots of conversion vs. Pt concentration typical to FCC operation are derived.)

Test Conditions:

The CO combustion test is done in a fixed fluid bed (FFB) mode. A one-inch (2.54 cm) diameter reactor is employed with a quartz coarse frit on which the catalyst bed is situated and through which the gas reactant flows upwards so that the bed is effectively fluidized. The reaction is run at near-atmospheric pressure and at a temperature of 1100° F. (593° C.). The reactant gas composition is 5% $CO_2$-3% $O_2$-5% CO-87% $N_2$, the gas flow rate is 400 cc/min, to permit proper fluidization at a linear velocity of 6.1 cm/sec; the space time is 0.9 gram.sec/cc. The catalyst is first purged for 20 minutes with nitrogen to allow the reactor to reach equilibrium conditions, then the reaction is carried out under the aforementioned conditions for 20 minutes, a time believed to be sufficient for steady state. At this point, the effluent gas stream is analyzed using an infrared (IR) analyzer from Servomex (Analyser Series 1400). The conversion of CO is calculated from the expression $(CO_{cyl}-CO_{reac})/CO_{cyl}$ where $CO_{cyl}$ is the IR reading calibrated to the known CO concentration in the reactant gas cylinder, and $CO_{reac}$ is the reading after the 20 minute reaction time.

The following materials and procedures were used in a laboratory test to produce a promoter based on 4% Lanthanum-4% Cerium supported on Puralox® alumina and containing 500 ppm platinum.

92.0 g Puralox Alumina High purity transition alumina (SCCa-5/90, Condea).

10.7 g Cerium (III) nitrate hexahydrate 99% (Aldrich)

10.7 g Lanthanum nitrate hexahydrate 99.99% (Aldrich)

21.0 g Deionized water 3.0 g Pt A-Salt diluted to provide 500 ppm Pt (Stock solution:17.75% Pt)

PROCEDURE

Making 6% Ce-4% La—$Al_2O_3$

1. Lanthanum and cerium nitrates are combined, 15 ml deionized water is added and stirring is applied constantly until complete dissolution occurs.

2. The volume of the solution is measured in a graduated cylinder. It should be approximately 24 ml. (An average increase of 50–60% in total volume can be expected.)

3. Enough deionized water is added to the graduated cylinder to bring the total volume of solution to 30 ml and the solution is mixed thoroughly.

4. The Puralox alumina is weighed into 16 oz. jar equipped with a lid.

5. The La-Ce solution is impregnated over Puralox alumina. The solution is allowed to become completely absorbed before shaking of the sample, to prevent the loss of any solution. The jar is capped and shaken vigorously until solution is evenly distributed in the Puralox (incipient wetness) and there are no visible lumps.

6. The sample is allowed to sit for 1 to 2 hours to come to equilibrium.

7. The sample is dried in a vacuum oven for 4 to 6 hours at 125° C., under 20in/Hg.

8. The sample is calcined at 1100° C. for 2 hours.

Dilution of Pt "A" Salt Solution 2.817 g of platinum solution (17.75%) is introduced to a 100 cc calibrated bottle. Enough deionized water is added to reach the 100 cc mark. The solution is shaken vigorously to mix evenly. 1 cc of this solution added to 10.0 g of sample will yield approximately 500 ppm platinum. This solution is applied to the sample after REO loading and calcination.

Making Puralox/500 ppm Pt 1. 30.0 g of the calcined Lanthanum 4%-Cerium 4% sample is placed in a 24 oz. jar with lid.

2. 3.0 g of the diluted platinum solution is poured over the sample. The jar is capped and shaken vigorously to mix the solution and alumina evenly until no lumps or adhesions on the jar walls are observable. (The sample becomes slightly warm when first blended with the platinum solution.)

FIG. 1 shows that 8% La provides complete alpha phase suppression with no free lanthana formed. This is attributed to complete use of the lanthana for coating of the alumina surface. The obtained Roller is 2.

FIG. 1 also shows that as a function of increasing the Ce concentration, at the expense of La concentration, $CeO_2$ is formed and its concentration increases gradually. However, at least up to 4% Ce (in the 4—4 combination), alpha alumina is not detected and the alumina hardness remains similar to that of 8% La.

Figure 2:
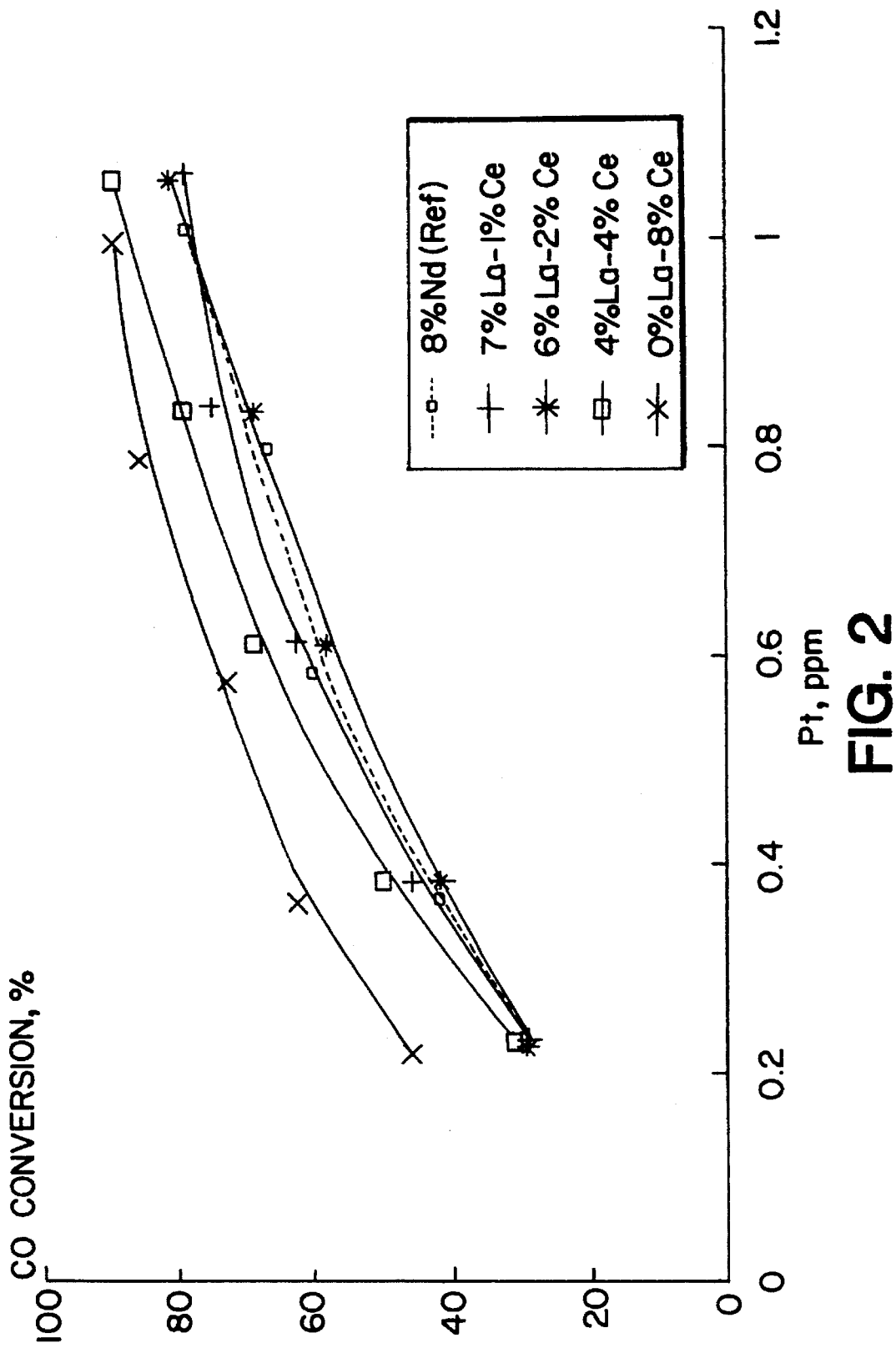
FIG. 2 is a graph demonstrating CO combustion activity of Ce-La transition alumina based Pt promoters over a range of Pt level from 0.2 to 1.1 ppm.

FIG. 2 shows the effect of La-Ce combinations on CO combustion activity of a promoter. In this case, the promoter contains 500 ppm Pt. The platinum is impregnated over the stabilized alumina as Pt/A-salt solution. The solution is a diluted stock solution and dilution is made so as to adjust the concentration to allow to add an amount of solution equal to 10% wt. of the alumina. This affords a final LOI of ~10% with about 30% of the pose volume filled with the solution, and a Pt concentration of about 500 ppm, usually 420–470 ppm as analyzed dry. No further treatment (such as drying the promoter, A-salt decomposition, Pt reduction, etc.) is necessary if instant use of the promoter is expected (i.e., within clays or weeks).

As seen in FIG. 2, the 8% Ce promoter has the highest activity and 4% Ce-4% La is intermediate, on an activity scale, between 8% Ce and less-than-4% Ce samples. Even though 8% Ce appears more active than the 4-by-4 promoter, we believe that the latter combination is a better choice in terms of the overall efficiency and suitability, because of the better alumina stabilization achieved by the lanthanum addition. The 4% Ce-4% La combination thus appears as a reasonable compromise which may afford optimal performance overall as a CO combustion promoter in the FCC unit.

It was found that surface areas, as measured by $N_2$ adsorption (BET) and by mercury porosimetry, pass a maximum between 2 and 4% Ce. The difference between these surface areas, which may reflect differences in pore shape, exhibits a minimum at ~2% Ce and approximately follows the activity trend. This establishes that there is a physical change as the Ce-La combination varies and the uniqueness of the 2% Ce sample is not based merely on the catalytic performance as observed in the CO test.

It is thus shown by FIG. 1 and 2 that the addition of Ce in the La-Ce 8% (total) system reduces CO promotion activity between 0 and 2% Ce, but then unexpectedly the activity is increased. The activity of the 2% Ce sample may be associated with a pore shape change that is not occurring with less or more Ce.

Although the CO-oxidation agent of this invention may be used by itself to reduce CO emissions from a variety of processes, it is particularly useful in combinative use with FCC catalysts.

The promoter particles may be preblended with particles of the base FCC catalyst to obtain a mixture which is charged to an FCC unit or the promoter particles can be added to an FCC unit separately from FCC catalyst particles.

It has been found that Ce-La alumina materials without Pt have virtually no catalytic effect in CO combustion under the conditions of the test procedure employed in evaluations reported herein. These conditions are believed to simulate the FCCU conditions.

Also, it was found that reducing the CO promoter of this invention in a $H_2/N_2$ stream at 400° C. for 2 hours prior to testing, does not affect the CO combustion perfomance.

We claim:

1. Attrition-resistant bodies comprising platinum supported on microspheres of transition alumina, said alumina microspheres having been impregnated with at least 2 weight percent $La_2O_3$ and from 3 to 8 weight percent $CeO_2$, followed by calcination at a temperature in excess of 1000° C., prior to addition of a source of platinum sufficient to provide from 50 to 1,000 ppm platinum thereto, said bodies being substantially free from alpha alumina and having an x-ray pattern showing the presence of crystalline $CeO_2$.

2. The bodies of claim 1 in which the cerium impregnated on said microsphere alumina is at least 4% expressed as $CeO_2$ and the amount of lanthanum expressed as $La_2O_3$ is in the range of 3 to 8%, the total amount of cerium and lanthanum expressed as oxide being in the range of 6 to 16%.

3. A carbon monoxide catalyst for use in a fluid catalytic cracking process which comprises about 4 to 8% $La_2O_3$, about 4 to 8% $CeO_2$ and from about 50 to 1000 ppm platinum supported on microspheres of a transition alumina substrate, sufficient cerium being present to form crystalline $CeO_2$ detectable by x-ray diffraction, said microspheres being substantially free from alpha alumina.

4. The microspheres of claim 3 which have a Roller attrition value below <4%.

* * * * *

UNITED STATES PATENT AND TRADEMARK OFFICE
CERTIFICATE OF CORRECTION

PATENT NO. : 5,565,399
DATED : October 15, 1996
INVENTOR(S) : Fraenkel, et al.

It is certified that error appears in the above-indentified patent and that said Letters Patent is hereby corrected as shown below:

On the Title page, item [73];

Assignee: Engelhard Corporation, Iselin, New Jersey

Signed and Sealed this

Twenty-fourth Day of December, 1996

Attest:

BRUCE LEHMAN

Attesting Officer     Commissioner of Patents and Trademarks